United States Patent
Schulte et al.

(10) Patent No.: US 10,538,073 B2
(45) Date of Patent: Jan. 21, 2020

(54) METHOD AND DEVICE FOR MENDING DAMAGED AREAS IN FIBER COMPOSITE COMPONENTS

(71) Applicant: AIRBUS OPERATIONS GMBH, Hamburg (DE)

(72) Inventors: Benedikt Schulte, Hamburg (DE); Tobias Barth, Hamburg (DE); Jan Bremer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 720 days.

(21) Appl. No.: 14/804,807

(22) Filed: Jul. 21, 2015

(65) Prior Publication Data

US 2016/0023450 A1     Jan. 28, 2016

(30) Foreign Application Priority Data

Jul. 24, 2014  (DE) .................. 10 2014 214 570

(51) Int. Cl.
*B32B 43/00*     (2006.01)
*B32B 38/00*     (2006.01)

(52) U.S. Cl.
CPC ........ *B32B 43/006* (2013.01); *B32B 38/0004* (2013.01)

(58) Field of Classification Search
CPC ............ B29C 69/005; B29C 2073/264; B32B 38/0004; B32B 38/10; B32B 43/006
See application file for complete search history.

(56) References Cited

U.S. PATENT DOCUMENTS

| | | | |
|---|---|---|---|
| 6,358,358 B1* | 3/2002 | Bilisoly | B32B 38/10 |
| | | | 156/247 |
| 2008/0206012 A1* | 8/2008 | Vas | B29C 66/1122 |
| | | | 411/171 |

(Continued)

FOREIGN PATENT DOCUMENTS

| | | |
|---|---|---|
| DE | 40 19 744 A1 | 1/1992 |
| DE | 197 20 845 A1 | 11/1998 |

(Continued)

OTHER PUBLICATIONS

Baker, A.A.; Dutton, S.; Kelly, D.: "Composite Materials for Aircraft Structures", 2nd ed., American Institute of Aeronautics and Astronautics Education Series, Reston, Virginia, USA, Chapter 10, pp. 369-401.

(Continued)

*Primary Examiner* — Mark A Osele
*Assistant Examiner* — Christopher C Caillouet
(74) *Attorney, Agent, or Firm* — Jenkins, Wilson, Taylor & Hunt, P.A.

(57) ABSTRACT

A method for mending damaged areas in fiber composite components formed from a plurality of unidirectional fiber layers includes the steps of automatically lifting at least one fiber layer of the fiber composite component at a cutting edge of the at least one fiber layer using a delaminating device, removing the at least one fiber layer in the extension direction of the fiber orientation of the at least one fiber layer, and separating off the removed at least one fiber layer in a defined manner at a separating edge defined by a separating device placed on the fiber composite component.

10 Claims, 1 Drawing Sheet

(56) References Cited

U.S. PATENT DOCUMENTS

| | | | | |
|---|---|---|---|---|
| 2009/0288760 A1* | 11/2009 | Garben | ............... | B41J 29/38 |
| | | | | 156/230 |
| 2011/0223373 A1* | 9/2011 | Abrams | ............... | D06Q 1/14 |
| | | | | 428/90 |
| 2013/0020735 A1* | 1/2013 | Hintze | ............... | B23C 3/00 |
| | | | | 264/162 |
| 2013/0133839 A1* | 5/2013 | Seo | ............... | B32B 43/006 |
| | | | | 156/715 |
| 2013/0255856 A1* | 10/2013 | Whitworth | ............... | B29C 73/10 |
| | | | | 156/98 |
| 2014/0079922 A1* | 3/2014 | Wang | ............... | C09D 7/1291 |
| | | | | 428/201 |

FOREIGN PATENT DOCUMENTS

| | | |
|---|---|---|
| DE | 199 43 751 A1 | 3/2001 |
| DE | 10 2010 004 570 A1 | 7/2011 |
| DE | 20 2013 002 818 U1 | 4/2013 |
| EP | 2 644 366 A1 | 10/2013 |
| EP | 2 442 941 B1 | 1/2014 |
| EP | 2 977 190 B1 | 3/2017 |
| WO | WO 2008/154889 A1 | 12/2008 |

OTHER PUBLICATIONS

German Search Report for Application No. 10 2014 214 570.8 dated Mar. 6, 2015.

Extended European Search Report for Application No. 15173105.6 dated Jan. 8, 2016.

\* cited by examiner

1

METHOD AND DEVICE FOR MENDING DAMAGED AREAS IN FIBER COMPOSITE COMPONENTS

CROSS-REFERENCE TO RELATED APPLICATION

This application claims priority to DE 10 2014 214 570.8 filed Jul. 24, 2014, the entire disclosure of which is incorporated by reference herein.

TECHNICAL FIELD

The present disclosure relates to a method and to a device for mending damaged areas in fiber composite components, in particular on carbon-fiber-reinforced plastics (CFRP) components for use in the field of aviation and aerospace.

BACKGROUND

Fiber-reinforced-plastics (FRP) components which are damaged have to be repaired accordingly, as described for example in Baker, A. A.; Dutton, S.; Kelly, D.: "Composite Materials for Aircraft Structures", 2nd ed., American Institute of Aeronautics and Astronautics Education Series, Blacksburg, Va., USA, Chapter 10, pp. 369-401. For this purpose, the damaged components are usually analysed as to the extent of the damage. Depending on the extent of the damage, a predetermined region around the damaged area is subsequently removed from the component. A blank made of undamaged fiber layers can subsequently be fitted into the cleared region and glued to the edge of the cleared region.

DE 40 19 744 A1 discloses a device for repairing a component made of fiber composite materials, which comprises a grinding device for stripping material in the region of a damaged area in the component. EP 2 644 366 A1 discloses a method for repairing laminated composite components in which, after a repair region around a damaged area in a fiber composite material is identified and defined, damaged fiber layers can be removed individually.

SUMMARY

However, there is a need for automated solutions for mending damaged areas in fiber composite components which can be implemented with high component throughput, reliability and precision of repair and with minimal risk of surface contamination during the repair.

A first aspect of the disclosure herein therefore provides a method for mending damaged areas in fiber composite components formed from a plurality of unidirectional fiber layers, comprising automatically lifting at least one fiber layer of the fiber composite component at a cutting edge of the at least one fiber layer using a delaminating device, removing the at least one fiber layer in the extension direction of the fiber orientation of the at least one fiber layer, and separating off the removed at least one fiber layer in a defined manner at a separating edge defined by a separating device placed on the fiber composite component.

A second aspect of the disclosure herein further provides a device for mending damaged areas in fiber composite components formed from a plurality of unidirectional fiber layers, comprising a delaminating device configured to lift at least one fiber layer of the fiber composite component automatically at a cutting edge of the at least one fiber layer and to remove the at least one fiber layer in the extension direction of the fiber orientation of the at least one fiber layer, a separating device configured to be placed on the fiber composite component so as to produce a cutting edge at which the removed at least one fiber layer can be separated off from the fiber composite component by the delaminating device, and a control device configured to control the delaminating device and the separating device in an automated manner.

Advantages of the aspects of the disclosure herein include that the damaged area preparation can proceed in an automated manner. This greatly increases the throughput of fiber composite components to be repaired. The repair can be carried out very precisely, since only the fiber layers or fiber layer regions which are actually damaged are removed separately and as required.

Because of the automation, it is no longer necessary to delaminate fiber layers by hand. This reduces the likelihood of contaminating cutting edges in the fiber composite component. Further, the use of electronically managed control methods for devices controlled in an automated manner for mending damaged areas, for example CNC algorithms, can provide more precise removal of individual fiber layers. Unknowing and/or unintentional damage to intact fiber layers under the region to be repaired is advantageously prevented. Particularly in the case of damage having an extent into the component which varies greatly along the component surface, an automated mending procedure can contribute to a reduction in waste when damaged fiber layers are stripped.

The solutions according to the disclosure herein for mending damaged areas in fiber composite components are particularly advantageous for the automotive industry and the aviation and aerospace sector, since the requirements on durable, stable and reliable repair options for damaged fiber composite components will continue to rise in the future because of the increasing spread of carbon-fiber materials in precisely these fields of use.

In one embodiment of the method according to the disclosure herein, the method may further comprise forming the cutting edge of the at least one fiber layer by cutting perpendicularly through the at least one fiber layer using a cutting device. As a result, it is not absolutely necessary to use a pre-existing cutting edge, for example at the edge of the fiber composite component, so as to be able to place the delaminating device on the fiber composite component. Instead, a cut may be made selectively in the centre of a fiber composite component so as to separate out the fiber layers from the fiber composite component only in regions.

In a further embodiment of the method according to the disclosure herein, the cutting edge of the at least one fiber layer may be formed by cutting perpendicularly through the at least one fiber layer using a cutting device.

At the same time, in a further embodiment of the method according to the disclosure herein, the step of non-invasively determining the depth of the damage to the damaged area to be mended of the fiber composite component may further be carried out using a sensor device, for example using an ultrasound sensor, an eddy current sensor, an infrared sensor or a radar sensor.

In a further embodiment of the method according to the disclosure herein, the delaminating device may comprise a delaminating blade which is guided under the fiber layer when the at least one fiber layer of the fiber composite component is automatically lifted.

At the same time, in a further embodiment of the method according to the disclosure herein, the delaminating blade may comprise two wedge-shaped blade parts which are pressed together so as to grip the at least one fiber layer when the at least one fiber layer is removed.

In a further embodiment of the method according to the disclosure herein, the delaminating device may further comprise a cutting collection device, on which the removed fiber material is laid after the at least one fiber layer is removed. For example, in a further embodiment of the method according to the disclosure herein, it is possible for the cutting collection device to comprise a cylindrical drum on which the removed fiber material is rolled up after the at least one fiber layer is removed.

In a further embodiment of the method according to the disclosure herein, the delaminating device may comprise a gripping device which acts adhesively on the fiber layer surface, the gripping device being placed on the fiber layer to remove the at least one fiber layer and being moved diagonally upwards away from the surface of the fiber composite component.

In one embodiment of the device according to the disclosure herein, the device may further comprise a cutting device configured to form a cutting edge of the at least one fiber layer by cutting perpendicularly through the at least one fiber layer.

In a further embodiment of the device according to the disclosure herein, the device may further comprise a sensor device configured to determine the depth of the damage to the damaged area to be mended of the fiber composite component by non-invasive measurement, for example an ultrasound sensor, an eddy current sensor, an infrared sensor or a radar sensor.

In a further embodiment of the device according to the disclosure herein, the delaminating device may comprise a delaminating blade configured to be guided under the fiber layer so as to lift the at least one fiber layer of the fiber composite component automatically. At the same time, in a further embodiment of the device according to the disclosure herein, the delaminating blade may comprise two wedge-shaped blade parts configured to be pressed together so as to grip the at least one fiber layer when the at least one fiber layer is removed.

In a further embodiment of the device according to the disclosure herein, the delaminating device may comprise a gripping device which acts adhesively on the fiber layer surface and which is configured to be placed on the fiber layer so as to remove the at least one fiber layer and to be moved diagonally upwards away from the surface of the fiber composite component.

In a further embodiment of the device according to the disclosure herein, the device may further comprise a cutting collection device having a cylindrical drum configured to roll up removed fiber material.

BRIEF DESCRIPTION OF THE DRAWINGS

In the following, the disclosure herein is described in greater detail in connection with and with reference to the embodiments as per the accompanying drawings.

The disclosure herein will be better understood by referring to the accompanying drawings, which illustrate variants of the disclosure herein. They are provided to illustrate principles, advantages, technical effects and possible variations. Naturally, other embodiments and many of the intended advantages of the disclosure herein are likewise conceivable, in particular in view of the detailed description of the disclosure herein given in the following. The elements of the drawings are not necessarily shown to scale, and are shown in a simplified or schematic manner in some cases for reasons of clarity. Like reference numerals denote like or similar components or elements.

DETAILED DESCRIPTION

Although specific embodiments are described and shown herein, it is clear to a person skilled in the art that a wide range of further, alternative and/or equivalent implementations for the embodiments can be selected without substantially departing from the fundamental idea of the present disclosure. In general, all variations, modifications and alternative forms of the embodiments described herein should also be considered to be covered by the disclosure herein.

Figure 1:
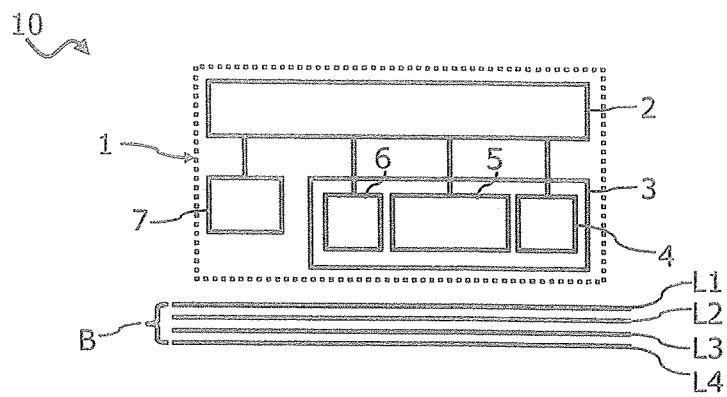
FIG. 1 is a functional diagram of a device for mending damaged areas in fiber composite components in accordance with one embodiment of the disclosure herein.

FIG. 1 is a schematic illustration of a device 10 for mending damaged areas in fiber composite components, for example a fiber composite component B constructed from a plurality of fiber layers L1 to L4 each having a unidirectional fiber orientation. In this context, unidirectional fiber orientation in a fiber layer means a transversely isotropic fiber layer of a fiber-reinforced-plastics composite in which all of the fibers are orientated in a single direction. In particular, the fibers may ideally be laid in parallel and with a homogeneous distribution. In the following, the abbreviated term "unidirectional fiber layers" is used for fiber layers having a unidirectional fiber orientation.

Figure 3:
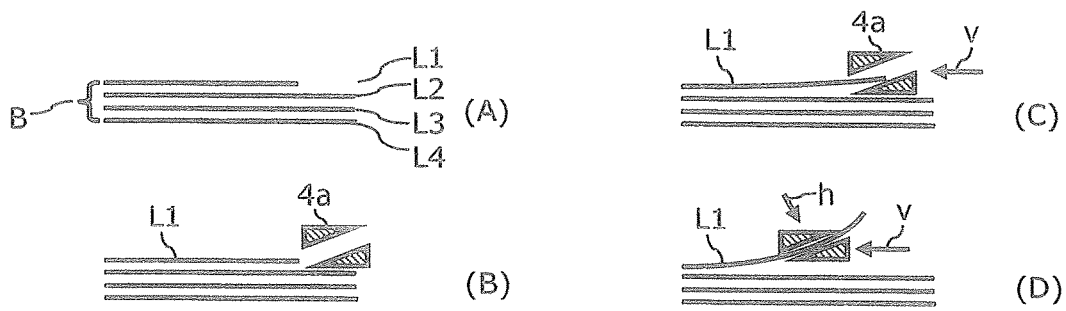
FIG. 3 shows schematic cross-sectional views of process stages in a process for mending damaged areas in fiber composite components in accordance with a further embodiment of the disclosure herein.

By way of example, FIG. 1—and also FIG. 3(A)—each show four fiber layers L1 to L4, although any other number of fiber layers is also possible. The underlying principle of the disclosure herein is not dependent on the number of fiber layers in the fiber composite component B, and the solutions according to the disclosure herein can be used for fiber composite components B having in principle any number of fiber layers L1 to L4. A fiber composite component B may for example be a carbon-fiber-reinforced plastics (CFRP) component for use in the field of aviation and aerospace, which is provided for example with a thermoset matrix such as epoxy resin or with a thermoplastic matrix for example of polyetherketone, polyetheretherketone, polyetherketoneketone, polyphenylenesulphide or polyetherimide.

In the following, in the description of the device 10 shown by way of example and functionally schematically in FIG. 1, reference is also made to the perspective view of individual components of a device 10 in FIG. 2.

The device 10 for mending damaged areas in fiber composite components B may comprise an active machining head 3, which can be guided over the fiber composite component B depending on the desired machining region. In the machining head 3, for example a delamination device 4 may be provided, which is configured to lift at least one fiber layer L1 of the fiber composite component B automatically at a cutting edge of the at least one fiber layer L1. By moving the delamination device 4 along the surface of the fiber composite component B and optionally away from the surface of the fiber composite component B, the delamination device 4 can remove the at least one fiber layer L1 in the extension direction of the fiber orientation of the at least one fiber layer L1. The delamination device 4 may comprise for example a delaminating blade 4a, which is guided under the at least one fiber layer L1 of the fiber composite component B and peels off the fiber layer L1 from the fiber layers L2 to L4 located underneath.

The delaminating blade 4a may comprise for example two wedge-shaped blade parts, as shown by way of example in FIG. 3(B). The lower wedge-shaped blade part is placed on the cutting edge of the fiber layer L1 and guided under the fiber layer L1. As is shown by way of example in FIG. 3(C), the delaminating blade 4a is subsequently moved over the surface of the fiber composite component B along the movement direction v, in other words counter to the opening direction of the wedge angle of the blade. Alternatively, the fiber composite component B may of course also be moved in the opposite direction under the delaminating blade 4a. The fiber layer L1—and optionally further fiber layers under which the delaminating blade 4a is slid in—is released from the fiber layers L2 to L4 located underneath by delamination effects. FIG. 3(D) shows by way of example that the two wedge-shaped blade parts can be pressed together in a clamping movement h, so as to be able to grip the fiber layer L1 and separate it from the remaining fiber layers L2 to L4 in an upward releasing movement.

Figure 2:
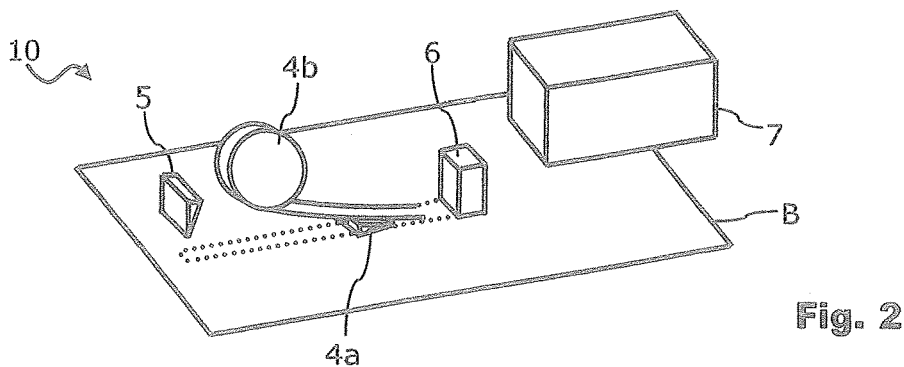
FIG. 2 is a schematic perspective view of a device for mending damaged areas in fiber composite components in accordance with a further embodiment of the disclosure herein.

As is shown in FIG. 2, the device 10 may have a cutting collection device 4b, for example a cylindrical drum, a receiving reel or a winch, configured to roll up removed fiber material. The peeled-off fiber material is thus collected in the cutting collection device 4b for disposal, so as to be able to prevent contaminations to the surface of the fiber composite component B by waste products when the damaged area is being mended. In addition to collecting cuttings, the cutting collection device 4b may also promote the delaminating effect of the delaminating blade 4a. For this purpose, the rolling-up movement of peeled-off fiber material about the cutting collection device 4b may lead to a tensile force on the strips of the fiber layer L1 which are to be removed. For example, the drum of the cutting collection device 4b may be moved over the fiber layer surface in a rolling movement to facilitate peeling off the fiber layer L1.

The width of the peeled-off fiber material depends on the width of the delaminating device 4. For this purpose, the delaminating device 4 is guided in the direction of the fiber orientation of the unidirectional fiber layers L1, in such a way that adjacent fibers always extend in parallel at the edge of the delaminating device 4. As a result, the adhesive forces at the edge of the delaminating device 4 are very small, and the fiber material can be peeled off in strips easily, or without significant adhesive resistance.

It is also possible to use a gripping device which acts adhesively on the fiber layer surface instead of a delaminating blade for the delaminating device 4. For example, a vacuum-based gripping tool may be placed on the fiber layer L1 and be moved diagonally upwards from the surface of the fiber composite component B so as to be able to remove the fiber layer L1 from the surface in strips. Equally, an adhesive can also be applied to the fiber layer L1 in the region of the fiber material to be removed, in such a way that a mechanical gripping tool adheres to the fiber layer L1 locally by the adhesive. In each case, during lifting or removal of the delaminating device 4, the local adhesive force of the delaminating device 4 on the fiber material is greater than the adhesive force between the fiber layer to be removed and the fiber layer located underneath. As a result, a strip of fiber material can be removed from the cutting edge away from the fiber composite component B.

So as to produce a clean separating edge, at which the removal of fiber material from the at least one fiber layer L1 can be ended in a defined manner, a separating device 6 which can be placed on the fiber composite component B is provided in the device 10. The separating device 6 may comprise for example a cutting edge, a sharp-edged tool, a tool having a low edge radius, or a template which can produce a separating edge at the point of application at which the removed fiber layer L1 can be separated off from the fiber composite component B. The fiber layer L1 is separated by controlled tearing at the separating edge.

The machining head 3 may for example further comprise a cutting device 5, such as a knife, a blade, a saw, a grinding tool, a laser cutting device, a milling tool or a water jet cutting device, configured to form a cutting edge in the fiber layer L1 by cutting perpendicularly through the fiber layer L1. The delaminating device 4 can be placed on this cutting edge so as to remove fiber material from the fiber layer L1 from the fiber composite component B.

The region in which fiber material is separated off from the fiber layer L1 by the delaminating device is therefore determined by the position of the cutting edge and the separating edge. The device 10 therefore comprises a control device 2 configured to control the delaminating device, the separating device 6 and optionally the cutting device 5 in an automated manner. The control may for example take place as a function of sensor signals of a sensor device 7 provided in the device 10, which is configured to determine the depth of the damage to the damaged area to be mended of the fiber composite component B by non-invasive measurement.

The sensor device 7 can be used for non-destructive testing (NDT) or non-destructive inspection (NDI) of the fiber composite component B. In this context, mechanical, structural and/or electrical properties of the fiber composite component B are tested without damaging the material of the fiber composite component B itself. Non-destructive testing methods may be carried our statically or dynamically, in other words by measuring a static electrical or magnetic field or by measuring a dynamic wave amplitude, for example an acoustic or electromagnetic wave. For this purpose, the sensor device 7 may comprise an ultrasound sensor, an eddy current sensor, an infrared sensor, a radar sensor or another suitable sensor type. Using the sensor device 7, as well as analysing the depth of the damaged fiber layers, among other things the thickness of paint layers or the thickness of lightning protection paints or panels on the fiber composite component B can be tested.

After the damaged point is measured, the device 10 may in each case determine regions for each of the fiber layers L1 to L4 in which strips of fiber material can be removed by selectively positioning cutting edges and/or separating edges. For this purpose, after the removal of fiber material from a fiber layer L1 which is placed higher, the device 10 may accordingly cut one or more fiber layers L2 to L4 located underneath which are cleared by the removal, so as in turn to remove fiber material from the lower-lying fiber layers L2 to L4. By selective iteration of the removal procedure for fiber layers, the iteration being determined in dimensions in accordance with the sensor signals of the sensor device 7, a depression which clears a predefined three-dimensional region about all of the damaged points in the fiber composite component B can be created in the fiber composite component B.

The depression may optionally subsequently be further prepared, for example by surface treatment by plasma etching, laser cutting, grinding, water jet treatment or similar surface activation measures. After the material removal, the damaged point can subsequently be mended again using various repair measures, for example by gluing in "fiber plasters", by injecting and curing liquid plastics material, by riveting, by gluing or using other suitable repair measures.

Figure 4:
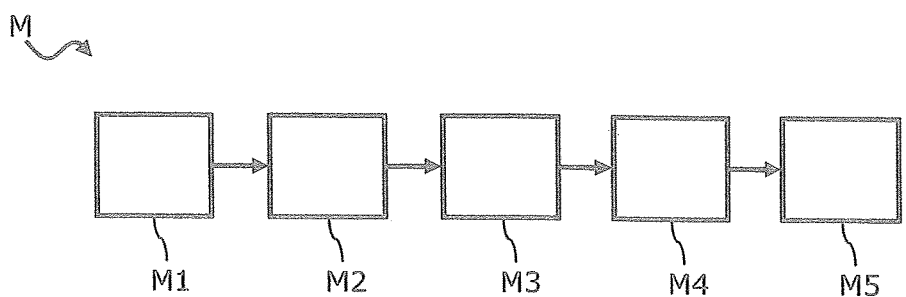
FIG. 4 is a block diagram of a method for mending damaged areas in fiber composite components in accordance with a further embodiment of the disclosure herein.

FIG. 4 is a block diagram of a method M for mending damaged areas in fiber composite components, for example of carbon-fiber-reinforced plastics (CFRP) components formed of a plurality of unidirectional fiber layers. To implement the method M in FIG. 4, a device for mending damaged areas in fiber composite components may be used, for example a device 10 as described in connection with FIGS. 1 to 3.

A first step M1, before the damaged area is actually mended, may comprise non-invasive determination of the depth of the damage to the damaged area to be mended of the fiber composite component B, by a sensor device 7, for example an ultrasound sensor, an eddy current sensor, an infrared sensor or a radar sensor. Depending on the determined sensor signals of the sensor device 7, a region to be mended can be established, and is defined in a step M2 by repeatedly forming cutting edges of the fiber layer lying on the surface in each case by cutting perpendicularly through the fiber layer using a cutting device 5.

In a step 3, at least one fiber layer of the fiber composite component B is automatically lifted at a cutting edge of the at least one fiber layer using a delaminating device 4. Subsequently, in step M4, the fiber layer can be removed in the extension direction of the fiber orientation of the fiber layer, for example by moving the delaminating device 4 over the surface and optionally away from the surface of the fiber composite component B. At a separating edge defined by a separating device 6 placed on the fiber composite component B, the removed fiber layer is subsequently separated off in step M5.

Steps M2 to M5 may advantageously be repeated, lower-lying fiber layers being cleared by removing fiber material from a fiber layer which is currently locally positioned at the surface of the fiber composite component B in each case, and being prepared accordingly in the next repetition of steps M2 to M5.

The delaminating device 4 may for example comprise a delaminating blade 4a which is guided under the fiber layer when the fiber layer of the fiber composite component is automatically lifted in step M3. For this purpose, the delaminating blade 4a may comprise two wedge-shaped blade parts, which are pressed together so as to grip the fiber layer when the fiber layer is removed in step M4. The removed fiber material may for example be stored in a cutting collection device 4b. The cutting collection device 4b may for example comprise a cylindrical drum, a receiving roller or a winch, on which the removed fiber material is rolled up after the removal in step M4.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for mending damaged areas in a fiber composite component formed from a plurality of unidirectional fiber layers, the method comprising:
   automatically lifting at least one fiber layer of the fiber composite component at a cutting edge of the at least one fiber layer using a delaminating device, which comprises a gripping device that acts adhesively on a surface of the at least one fiber layer, wherein the gripping device is placed on the at least one fiber layer to remove the at least one fiber layer and is moved diagonally upwards away from a surface of the fiber composite component;
   removing the at least one fiber layer in an extension direction of a fiber orientation of the at least one fiber layer; and
   separating off the removed at least one fiber layer in a defined manner at a separating edge defined by a separating device placed on the fiber composite component.

2. The method according to claim 1, comprising forming the cutting edge of the at least one fiber layer by cutting perpendicularly through the fiber layer using a cutting device.

3. The method according to claim 1, comprising non-invasively determining a depth of damage to the damaged area of the fiber composite component to be mended using a sensor device.

4. The method according to claim 3, wherein the sensor device comprises an ultrasound sensor, an eddy current sensor, an infrared sensor, or a radar sensor.

5. The method according to claim 1, wherein the delaminating device comprises a delaminating blade which is guided under the fiber layer when the at least one fiber layer of the fiber composite component is automatically lifted.

6. The method according to claim 5, wherein the delaminating blade comprises two wedge-shaped blade parts which are pressed together to grip the at least one fiber layer when the at least one fiber layer is removed.

7. The method according to claim 6, wherein the delaminating device comprises a cutting collection device, on which removed fiber material is laid after the at least one fiber layer is removed.

8. The method according to claim 7, wherein the cutting collection device comprises a cylindrical drum, on which the removed fiber material is rolled up after the at least one fiber layer is removed.

9. The method according to claim 5, wherein the delaminating device comprises a cutting collection device, on which removed fiber material is laid after the at least one fiber layer is removed.

10. The method according to claim 9, wherein the cutting collection device comprises a cylindrical drum, on which the removed fiber material is rolled up after the at least one fiber layer is removed.

* * * * *